(12) United States Patent
Kondo et al.

(10) Patent No.: US 7,046,601 B2
(45) Date of Patent: May 16, 2006

(54) METHOD OF CONTROLLING LASER POWER OF MAIN BEAM BY MONITORING SUB BEAM

(75) Inventors: Tamon Kondo, Kyoto (JP); Takashi Nagano, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 346 days.

(21) Appl. No.: 10/383,103

(22) Filed: Mar. 6, 2003

(65) Prior Publication Data
US 2003/0210624 A1    Nov. 13, 2003

(30) Foreign Application Priority Data
Mar. 7, 2002    (JP) .............................. 2002-062210

(51) Int. Cl.
*G11B 7/00* (2006.01)
(52) U.S. Cl. .............................. 369/47.53; 369/44.41; 369/116; 369/53.27
(58) Field of Classification Search ............ 369/47.53, 369/44.28, 44.27, 44.35, 44.37, 47.5, 53.1, 369/53.26, 59.11, 116, 44.41, 53.27; 341/122
See application file for complete search history.

(56) References Cited

U.S. PATENT DOCUMENTS

| | | | | |
|---|---|---|---|---|
| 4,700,173 A | * | 10/1987 | Araki et al. ................. | 341/122 |
| 5,126,994 A | * | 6/1992 | Ogawa et al. ............... | 369/116 |
| 5,155,717 A | * | 10/1992 | Bakx ........................ | 369/44.37 |
| 5,159,589 A | * | 10/1992 | Ohsato ...................... | 369/44.35 |
| 5,363,357 A | * | 11/1994 | Niwayama ................ | 369/44.27 |

(Continued)

FOREIGN PATENT DOCUMENTS

JP    05-89472    4/1993

(Continued)

OTHER PUBLICATIONS

Yasuteru Mizomoto, Japanese Office Action, Notice of Rejection, Japanese Patent Office, pp. 1-2, (Dec. 26, 2005).

*Primary Examiner*—William Korzuch
*Assistant Examiner*—Kim-Kwok Chu
(74) *Attorney, Agent, or Firm*—Pillsbury Winthrop Shaw Pittman LLP (57) ABSTRACT

A method is designed for recording information on an optical disk in the form of a sequence of pits along a track of the optical disk. The method is carried out by the steps of generating a main optical beam and a sub optical beam while modulating a power of the main optical beam and the sub optical beam according to a recording signal representative of the information, the main optical beam having a power sufficient to form the pit, the sub optical beam having a power insufficient to form the pit, irradiating the main optical beam along the track to form the sequence of pits, irradiating the sub optical beam onto a vicinity area which is not irradiated by the main optical beam but which is adjacent to an area irradiated by the main optical beam, detecting a first return signal level of the sub optical beam reflected back from the vicinity area at a timing when the pit is formed by the main optical beam, detecting a second return signal level of the sub optical beam reflected back from the vicinity area at another timing when the pit is not formed, and controlling the power of the main optical beam in a real time basis during the recording of information based on both of the first return signal level and the second return signal level of the sub optical beam.

10 Claims, 4 Drawing Sheets

U.S. PATENT DOCUMENTS 6,246,660 B1 * 6/2001 Yanagawa .................... 369/116
6,438,077 B1 * 8/2002 Mashimo ................. 369/44.28
2002/0101805 A1 8/2002 Ishiwata

FOREIGN PATENT DOCUMENTS

JP 07-114732 5/1995
JP 2002-230766 8/2002

* cited by examiner

METHOD OF CONTROLLING LASER POWER OF MAIN BEAM BY MONITORING SUB BEAM

BACKGROUND OF THE INVENTION

1. Field of the Invention

This invention relates to an optical disk recording method and an apparatus for use in such method, in which a laser power (intensity of a recording laser beam) during a pit formation is controllable to an optimal value where a favorable recording condition is achieved.

2. Prior Art

In recording on a write-once-read-many optical disk such as a CD-R or a DVD-R, test recording is performed with various settings of a laser power before actual recording, recorded data are reproduced after the test recording to obtain a laser power where an optimal recording condition is achievable (for example, where an asymmetry value of a target reproduction signal is achievable), and then a laser power is set to the optimal value to perform the actual recording. Even if the optimal recording condition is achieved at the beginning of the recording, however, it sometimes becomes hard to achieve the optimal recording condition in the initial laser power as the recording proceeds due to a change in the disk condition such as a disk warp or a change in a film thickness of a recording layer (a pigment film formed by a spin coat method sometimes has a different film thickness between the inner circumferential side and the outer circumferential side of the disk). Therefore, there have conventionally been suggested methods of controlling a laser power in real time to a value where an optimal recording condition is achievable by detecting the recording condition while recording is performed. One of those is a method of controlling a laser power on the basis of a returning light receiving signal of a main beam for recording.

In the method of controlling the laser power on the basis of the returning light receiving signal of the main beam, there is a need for sampling the returning light receiving signal of the main beam during a period in which the returning light receiving signal of the main beam shows a stable level. High-speed recording, however, causes the period in which the returning light receiving signal of the main beam shows the stable level to be short, thereby making it hard to control the sampling timing of the returning light receiving signal of the main beam.

SUMMARY OF THE INVENTION

In view of the foregoing, the present invention is designed to provide an optical disk recording method of controlling a laser power to a value where a favorable recording condition is achievable and an apparatus for use in such a method.

The inventive method is designed for recording information on an optical disk in the form of a sequence of pits along a track of the optical disk. The inventive method comprises the steps of generating a main optical beam and a sub optical beam while modulating a power of the main optical beam and the sub optical beam according to a recording signal representative of the information, the main optical beam having a power sufficient to form the pit, the sub optical beam having a power insufficient to form the pit, irradiating the main optical beam along the track to form the sequence of pits, irradiating the sub optical beam onto a vicinity area which is not irradiated by the main optical beam but which is adjacent to an area irradiated by the main optical beam, detecting a first return signal level of the sub optical beam reflected back from the vicinity area at a timing when the pit is formed by the main optical beam, detecting a second return signal level of the sub optical beam reflected back from the vicinity area at another timing when the pit is not formed, and controlling the power of the main optical beam in a real time basis during the recording of information based on both of the first return signal level and the second return signal level of the sub optical beam.

Expediently, the step of controlling comprises subtracting the second return signal level from the first return signal level to obtain a subtraction value, comparing the subtraction value with a predetermined reference value to obtain a comparison result, and controlling the power of the main optical beam based on the comparison result.

Further expediently, the inventive method comprises the steps of provisionally irradiating the main optical beam onto a test area of the optical disk to determine an optimal power of the main optical beam, and predetermining the reference value in correspondence to the optimal power, so that the power of the main optical beam is controlled to follow the optimal power.

An inventive apparatus is designed for recording information on an optical disk in the form of a sequence of pits along a track of the optical disk. The inventive apparatus comprises an optical head that generates a main optical beam and a sub optical beam while modulating a power of the main optical beam and the sub optical beam according to a recording signal representative of the information, the main optical beam having a power sufficient to form the pit, the sub optical beam having a power insufficient to form the pit, the optical head irradiating the main optical beam along the track to form the sequence of pits, and irradiating the sub optical beam onto a vicinity area which is not irradiated by the main optical beam but which is adjacent to an area irradiated by the main optical beam, a first sample & hold circuit that samples and holds a first return signal level detected from the sub optical beam reflected back from the vicinity area at a timing when the pit is formed by the main optical beam, a second sample & hold circuit that samples and holds a second return signal level detected from the sub optical beam reflected back from the vicinity area at another timing when the pit is not formed, a subtracting circuit that subtracts the second return signal level sampled and held by the second sample & hold circuit from the first return signal level sampled and held by the first sample & hold circuit to obtain a subtraction value, a comparing circuit that compares the subtraction value with a predetermined reference value to obtain a comparison result, and a controlling circuit that controls the power of the main optical beam based on the comparison result.

Another inventive apparatus is designed for recording information on an optical disk in the form of a sequence of pits along a track of the optical disk. The inventive apparatus comprises an optical head that generates a main optical beam and a pair of preceding and succeeding sub optical beams while modulating a power of the main optical beam and the preceding and succeeding sub optical beams according to a recording signal representative of the information, the main optical beam having a power sufficient to form the pit, the preceding and succeeding sub optical beams having a power insufficient to form the pit, the optical head irradiating the main optical beam along the track to form the sequence of pits, irradiating the preceding sub optical beam onto a vicinity area which is not irradiated by the main optical beam and which precedes to a target area irradiated by the main optical beam, and irradiating the succeeding sub optical beam onto another vicinity area which is not irradiated by the main optical beam and which succeeds to a target area irradiated by the main optical beam, a main optical receiving element contained in the optical head and divided into four segments for receiving the main optical beam reflected back from the target area and outputting four output signals from the four segments, a preceding optical receiving element contained in the optical head and divided into two segments for receiving the preceding sub optical beam reflected back from the vicinity area and outputting two output signals from the two segments, a succeeding optical receiving element contained in the optical head and divided into two segments for receiving the succeeding sub optical beam reflected back from the vicinity area and outputting two output signals from the two segments, a tracking control circuit that performs a differential push-pull tracking control based on the output signals from the main optical receiving element and the preceding and succeeding optical receiving elements for tracking the main optical beam along the track of the optical disk, a focusing control circuit that performs a focusing control based on the output signals from the main optical receiving element for focusing the main optical beam relative to the target area, a summing circuit that sums the two output signals with each other fed from the two segments of either the preceding or succeeding optical receiving element to provide a summation value, a first sample & hold circuit that samples and holds a first summation value outputted from the summing circuit at a timing when the pit is formed by the main optical beam, a second sample & hold circuit that samples and holds a second summation value outputted from the summing circuit at another timing when the pit is not formed, a subtracting circuit that subtracts the second summation value from the first summation value to obtain a subtraction value, a comparing circuit that compares the subtraction value with a predetermined reference value to obtain a comparison result, and a controlling circuit that controls the power of the main optical beam based on the comparison result.

DETAILED DESCRIPTION OF THE INVENTION

Figure 2:
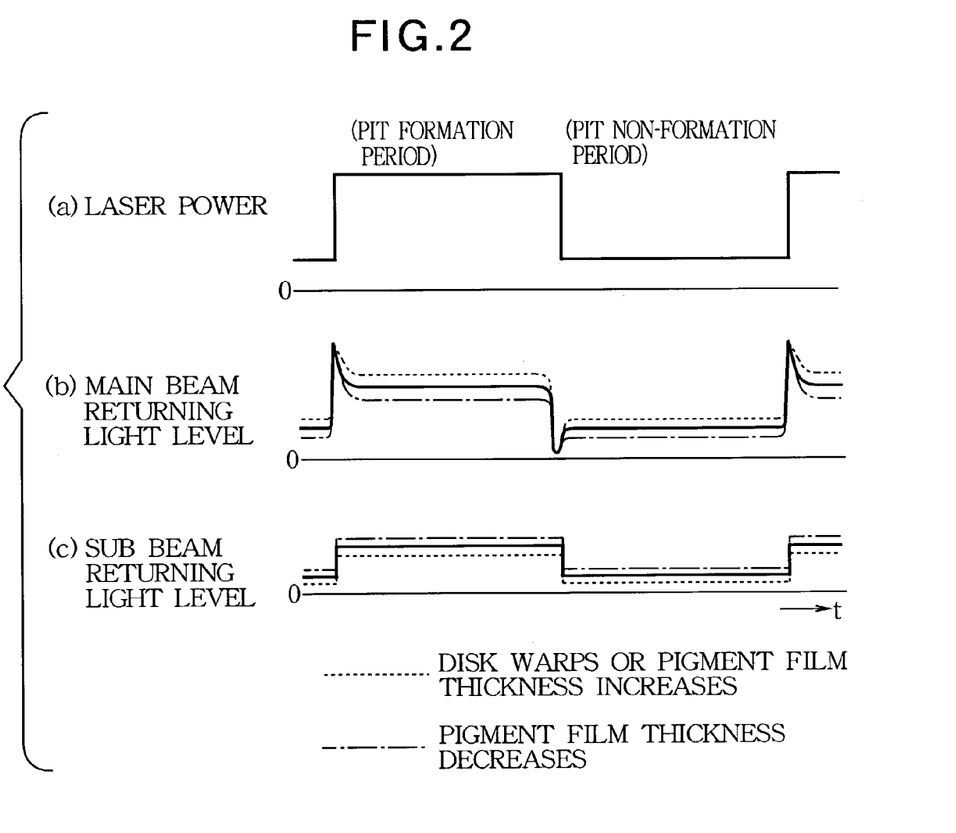
FIG. 2 is a waveform diagram showing variation in a returning light receiving signal of a main beam and in a returning light receiving signal of a sub beam caused by a disk warp or a change in a pigment film thickness.

The detailed description will be first given for a basic concept of the invention. Referring to FIG. 2, there are shown the following conditions at recording on a CD-R:
(a) A laser power;
(b) Total returning light receiving outputs of the main beam;
(c) Total returning light receiving outputs of a sub beam.

The returning light receiving output of the main beam (b) shows a sharp rise to a peak when irradiation with the beam at the recording level is started since no color change occurs in a pigment film. Thereafter, a change occurs in the pigment film and the output goes down as the reflectance decreases. It is stable at a given level and drops once to a level lower than the level before the start of the irradiation (a reproduction level) simultaneously with an end of the irradiation, and shortly thereafter the level returns to the level before the start of the irradiation. On the other hand, the returning light receiving output of the sub beam (c) does not change during a pit formation period with the main beam since the sub beam does not alter the pigment film. If the disk warps relative to the initial condition indicated by a solid line in FIG. 2, the returning light receiving output of the main beam in the pit formation period increases as indicated by a broken line in (b). It is because the warped disk disables a beam spot from being fully narrowed, which deteriorates a change efficiency of the pigment film (restrains a color change in the pigment film), thereby decreasing an absorption of the optical beam and increasing a reflectance thereof. Furthermore, if a thickness of the pigment film increases, a recording sensitivity decreases, which deteriorates the change efficiency of the pigment film, thereby increasing the reflectance and increasing the returning light receiving output of the main beam in the pit formation period as indicated by the broken line in (b). By contrast, if the thickness of the pigment film decreases, the recording sensitivity increases, which facilitates the change efficiency of the pigment film (which activates the change in the pigment film), thereby decreasing the reflectance and reducing the returning light receiving output of the main beam in the pit formation period as indicated by a chain line in (b).

On the other hand, the returning light receiving output of the sub beam decreases as indicated by a broken line in (c) if the disk warps. It is because the warped disk decreases a reflection intensity. Furthermore, if the pigment film thickness increases, a reflectance of a reflecting film under the pigment film comes down, by which the returning light receiving output of the sub beam decreases as indicated by the broken line in (c). By contrast, if the pigment film thickness decreases, the reflectance of the reflecting film under the pigment film rises up, by which the returning light receiving output of the sub beam increases as indicated by the chain line in (c). The fluctuation of the reflection intensity of the sub beam occurs both in the pit formation period and in the pit non-formation period. Even if the fluctuation of the reflection intensity occurs, no change occurs in a level ratio of a high level at the pit formation to a low level at the pit non-formation, though a change occurs in a level difference between them. In other words, the level difference increases if the reflection intensity increases, while the level difference decreases if the reflection intensity decreases. Therefore, a change in the disk condition can be detected by detecting the level difference.

Accordingly, the optical disk recording method of the present invention comprises emitting a main beam and a sub beam modulated with a recording signal from an optical head, irradiating a track on an optical disk with the main beam for a pit formation, irradiating a portion where no pit is formed in the vicinity of a target portion irradiated by the main beam with the sub beam not reaching a pit formation level, and controlling a laser power at the pit formation in real time according to a returning light receiving signal level of the sub beam observed at a timing during the pit formation and at another timing during the pit non-formation. Since the main beam is used for the pit formation, the returning light receiving signal has a non-rectangular waveform as shown in FIG. 2(b), where the level is stable only in a part of the pit formation period and the stable period becomes shorter as the recording speed is increased. By contrast, the sub beam is not used for the pit formation, and therefore the returning light receiving signal of the sub beam has a rectangular waveform as shown in FIG. 2(c), where the level is stable in the entire pit formation period. Therefore, according to the present invention, a change in the disk condition is detected on the basis of the returning light receiving signal of the sub beam, thereby enabling the apparatus to detect a change in the disk condition precisely even in high-speed recording and to control the laser power to a value where a favorable recording condition is achievable. It is also possible to control the laser power during the pit formation according to only the level of the returning light receiving signal of the sub beam at one of the timings; during the pit formation and during the pit non-formation. It is, however, more effective to improve a control precision since an offset can be canceled when the offset is caused by a temperature characteristic in a sample & hold circuit or the like, if the laser power of the main beam during the pit formation is controlled according to the level of the returning light receiving signal of the sub beam at both timings; during the pit formation and during the pit non-formation as described in the present invention.

Figure 1:
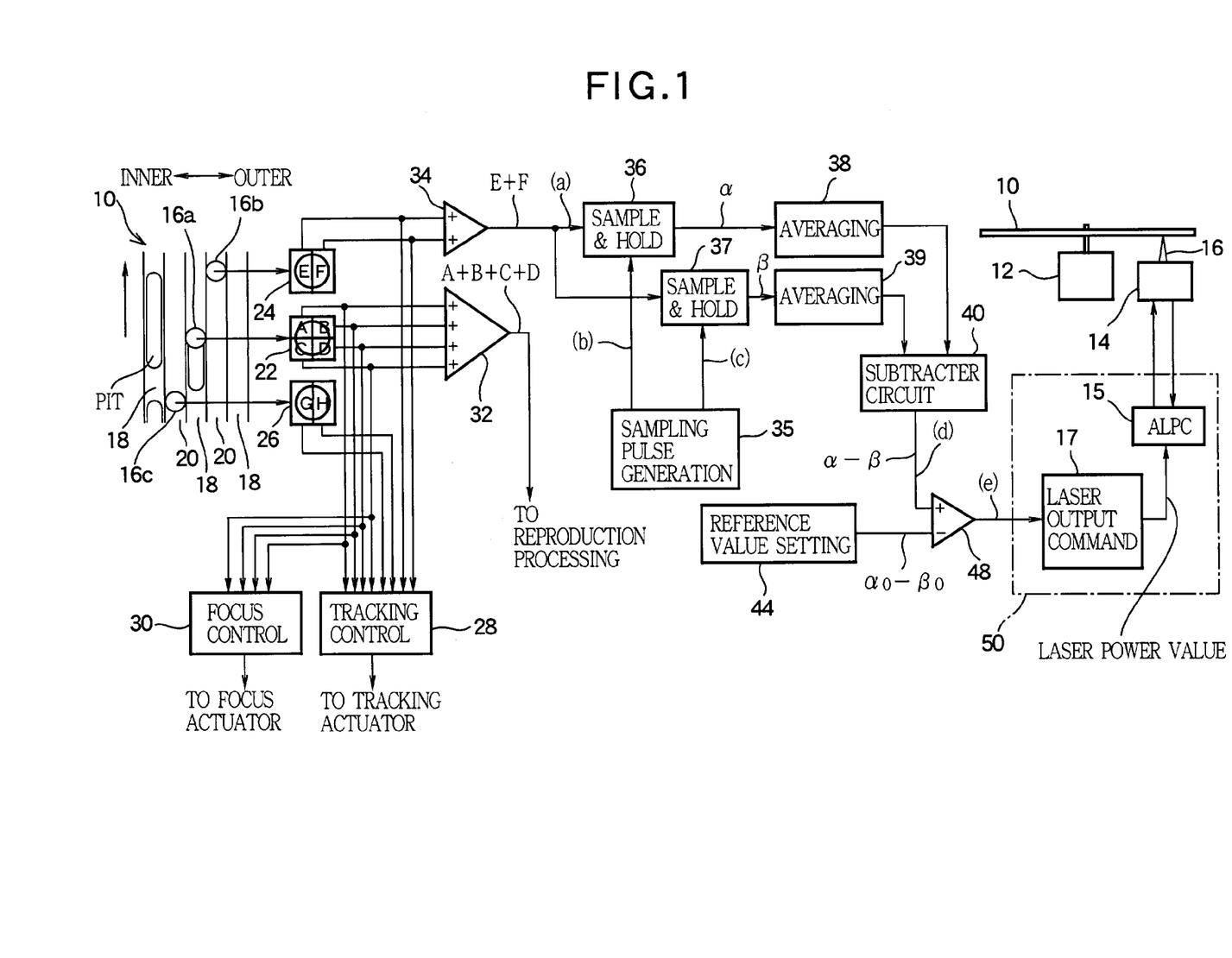
FIG. 1 is a block diagram showing an embodiment of the present invention.

Now the detailed description is given to embodiments of the invention. Referring to FIG. 1, there is shown an embodiment in which the present invention is applied to a CDR recording apparatus performing a differential push-pull tracking control. An optical disk 10 (a CD-R disk) is rotatably driven by a spindle motor 12 and information is recorded and reproduced with a laser beam 16 emitted from an optical head 14. The laser power is controlled by an automatic laser output control (ALPC) circuit 15 to a laser power value determined by a laser output command circuit 17. A laser beam 16 emitted from the optical head 14 consists of three beams of a main beam 16a, a preceding sub beam 16b, and a succeeding sub beam 16c. The main beam 16a is applied to a track 18 on the optical disk 10 and the preceding sub beam 16b is applied to a portion preceding the main beam 16a in an inter-track position 20 deviating from the main beam 16a by a half pitch in the outer circumferential direction. The succeeding sub beam 16c is applied to a portion succeeding the main beam 16a in an inter-track position 20 deviating from the main beam 16a by a half pitch in the inner circumferential direction.

Returning light of the main beam 16a is received by a four-segment light receiving element 22. Returning light of the preceding sub beam 16b is received by a two-segment light receiving element 24. Returning light of the succeeding sub beam 16c is received by a two-segment light receiving element 26. Light receiving signals from the light receiving elements 22, 24, and 26 are input to a tracking control circuit 28, and a differential push-pull tracking error signals are generated in a known operation to perform a differential push-pull tracking control of the optical head 14. In addition, each light receiving signal of the four-segment light receiving element 22 is input to a focus control circuit 30 and a focus error signal is generated in a known operation to perform a focus control of the optical head 14.

Light receiving signals A, B, C, and D of the four-segment light receiving element 22 are added up by a summing amplifier 32 to generate a signal A+B+C+D. This signal is sent to a reproduction circuit (not shown), where reproduction (demodulation) processing of the recorded information is performed. Light receiving signals E and F of the two-segment light receiving element 24 are added up by a summing amplifier 34 to generate a signal E+F. A sampling pulse generation circuit 35 generates a pit formation section sampling pulse at a given timing within the pit formation period of the recording signal and generates a pit non-formation section sampling pulse at another given timing within the pit non-formation period of the recording signal. A sample & hold circuit 36 samples the signal E+F at the pit formation section sampling pulse timing, and a sample & hold circuit 37 samples the signal E+F at the pit non-formation section sampling pulse timing. While the sampling pulse generation circuit 35 can generate the pit formation section sampling pulse in the entire pit formation period and can generate the pit non-formation section sampling pulse in the entire pit non-formation period, it can generate the pit formation section sampling pulse only in a specific length of a pit formation section (for example, 11T pit formation section) and can generate the pit non-formation section sampling pulse only in a specific length of a pit non-formation section (for example, 11T land formation section), too.

Sample & hold outputs α (a level value of the signal E+F in the pit formation section) and β (the signal E+F in the pit non-formation section) of the sample & hold circuits 36 and 37 are input to averaging circuits 38 and 39, where they are averaged with a given time constant. A subtracter circuit 40 subtracts an average of the value β output by the averaging circuit 39 from an average of the value α output by the averaging circuit 38 to obtain a subtraction value α−β.

A reference value setting circuit 44 sets a reference value $\alpha_0-\beta_0$ of α−β. The reference value $\alpha_0-\beta_0$ can be a value of α−β at a certain power (for example, the record power with which a target asymmetry value is achievable) determined to be optimum in the test recording (OPC: optimum power control) performed before the actual recording. A comparator 48 compares an output from the subtracter circuit 40 with an output from the reference value setting circuit 44, and outputs a signal according to a deviation between them. The output from the comparator 48 is input to a laser output command circuit 17 of a laser output control circuit 50. The laser output command circuit 17 adjusts the laser power value during the pit formation so as to negate or cancel the deviation according to an output from the comparator 48. An ALPC circuit 15 controls a laser power during the pit formation to the command value.

Figure 3:
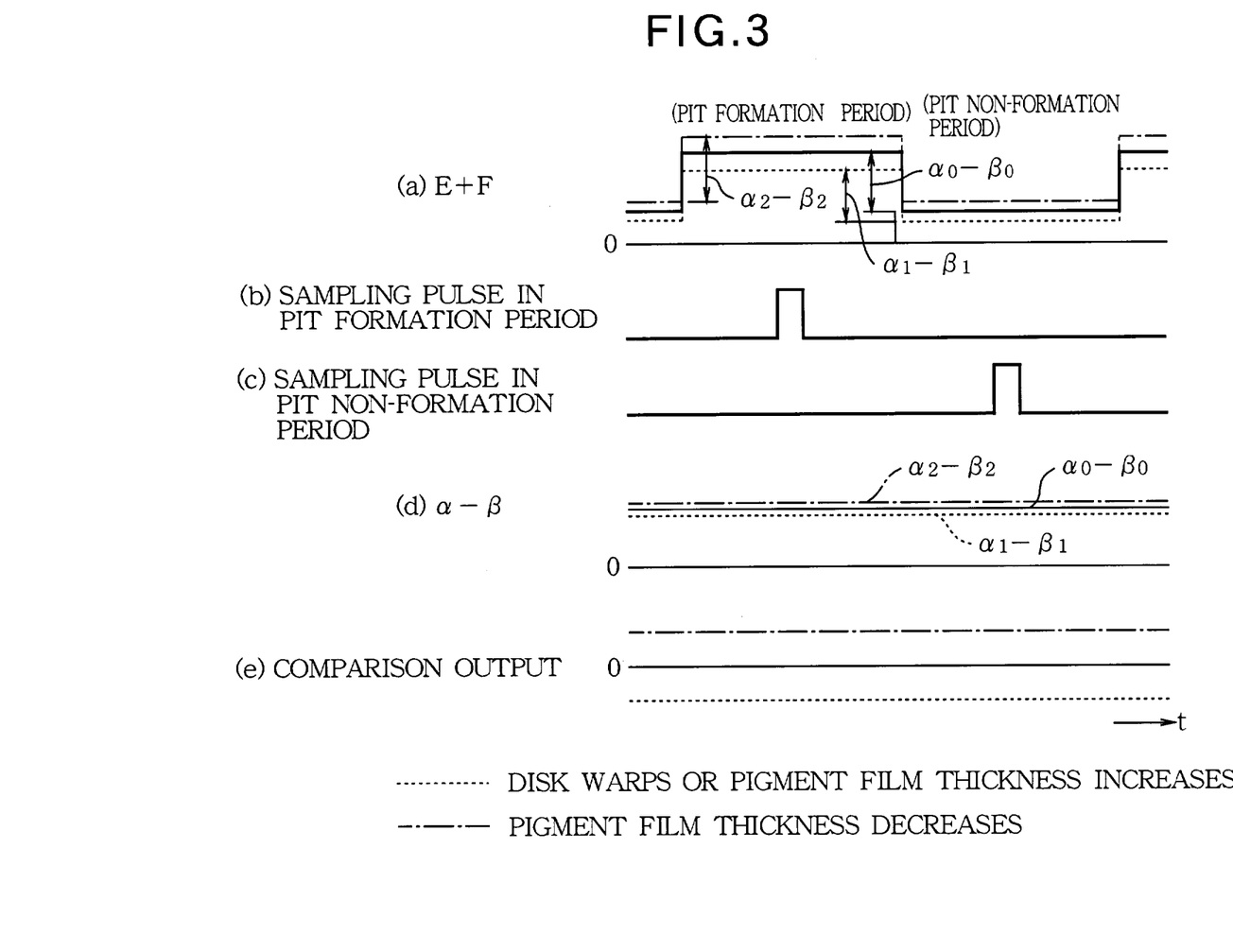
FIG. 3 is an operation waveform diagram in each unit of the circuit shown in FIG. 1.

Operation waveforms of the portions indicated by (a) to (e) in FIG. 1 are shown in (a) to (e) in FIG. 3. The waveforms change from the regular shape indicated by solid lines to those indicated by broken lines if the optical disk 10 warps or a pigment film thickness in a recorded portion increases. In other words, the signal E+F level goes down both in the pit formation section and the pit non-formation section. In this case, a decrement in the pit formation section is the same as that in the pit non-formation section, though the level difference in the pit formation section is larger than that in the pit non-formation section. It is because an absolute level of the signal E+F in the pit formation section is higher than another absolute level of the signal E+F in the pit non-formation section, and therefore a value obtained by multiplying each of the absolute levels by the same ratio, in other words, a level difference is larger in the pit non-formation section having a higher absolute level. In addition, if the pigment film thickness in a recorded portion decreases relative to the regular shape indicated by the solid line, the waveforms change as indicated by chain lines. In other words, the signal E+F rises both in the pit formation section and in the pit non-formation section. In this case, an increment in the pit formation section is the same as that in the pit non-formation section, though the level difference in the pit formation section is larger than that in the pit non-formation section. Therefore, the level difference α–β between the pit formation section and the pit non-formation section of the signal E+F has the following relations:

$$\alpha_2-\beta_2 > \alpha_0-\beta_0 > \alpha_1-\beta_1$$

where $a_0-\beta_0$ is the regular condition, $\alpha_1-\beta_1$ is the condition indicated by the broken line, and $\alpha_2-\beta_2$ is the condition indicated by the chain line. Accordingly, the output from the subtracter circuit 40 changes as shown in FIG. 3(*e*).

The comparator 48 compares the output from the subtracter circuit 40 with the reference value $\alpha_0-\beta_0$ and then outputs a comparison output according to the deviation as shown in FIG. 3(*d*). In other words, if the signal E+F level decreases since the optical disk 10 warps or the pigment film thickness in the recorded portion increases, the level difference α–β decreases, by which the output from the comparator 48 grows in a negative direction and the laser output command circuit 17 increases the laser power value. As a result, the level difference α–β returns to the regular value $\alpha_0-\beta_0$. If the signal E+F level rises since the pigment film thickness in the recorded portion decreases, the level difference α–β increases, by which the output from the comparator 48 grows in a positive direction and the laser output command circuit 17 decreases the laser power value. As a result, the level difference α–β returns to the regular value $\alpha_0-\beta_0$. In this manner, the stable recording is achieved independently on whether or not the disk warps or a change occurs in the recording film thickness.

Figure 4:
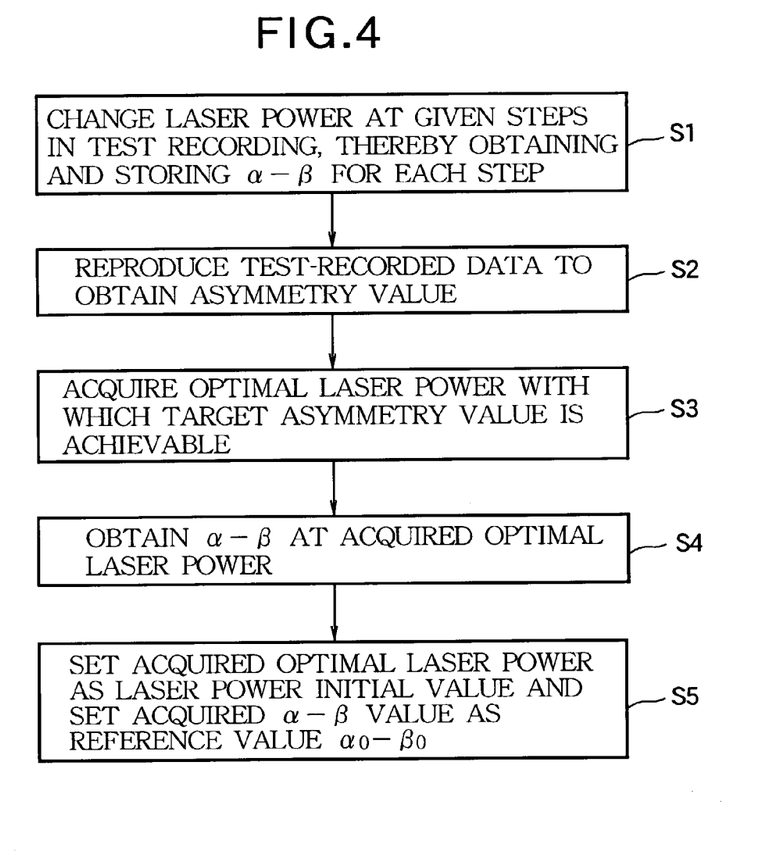
FIG. 4 is a control flowchart at test recording in the optical disk recording apparatus shown in FIG. 1.

Referring to FIG. 4, there is shown a control at the test recording in the optical disk recording apparatus shown in FIG. 1. The optical head 14 is moved to a PCA area (power calibration area) on the inner circumferential side of a lead-in area of the optical disk 10, and a laser power is varied in given steps to perform test recording. In the recording, the value of α–β is obtained in each step and is recorded into a memory (S1). After the test recording, the recorded data are reproduced to obtain an asymmetry value in each step (S2). A selection or an operation is made to obtain a laser power by which a target asymmetry value is achievable (S3). A further selection or operation is made to obtain the value of α–β for the obtained laser power (S4). The obtained laser power is set as a laser power initial value to the laser output command circuit 17 and the obtained value of α–β is set as the reference value $\alpha_0-\beta_0$ to the reference value setting circuit 44 (S5). As described hereinabove, the optical disk recording apparatus is ready for the actual recording.

Figure 5:
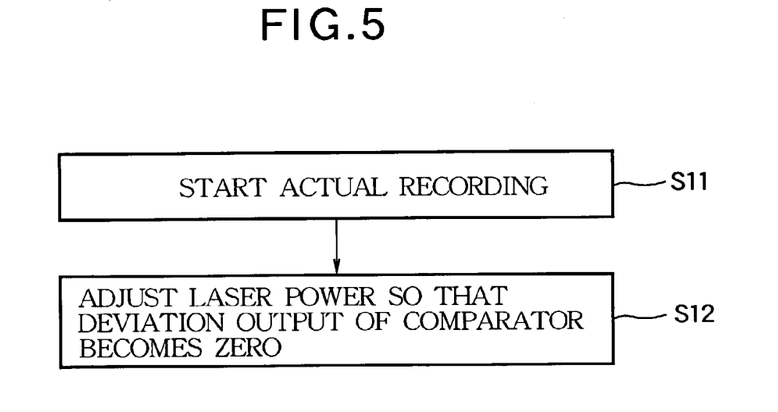
FIG. 5 is a control flowchart of a laser power at actual recording in the optical disk recording apparatus shown in FIG. 1.

Referring to FIG. 5, there is shown a control method at the actual recording in the optical disk recording apparatus shown in FIG. 1. After a start of the actual recording (S11), the value of α–β is acquired repeatedly and a laser power value output from the laser output command circuit 17 is adjusted so that a deviation output from the comparator 48 becomes zero (S12). This enables a favorable recording condition to be maintained even if the optical disk 10 warps or a change occurs in the pigment film thickness in the middle of the recording.

While the returning light receiving signal E+F of the preceding sub beam is used as a monitored returning light receiving signal of the sub beam in the above embodiment, it is also possible to use a returning light receiving signal G+H of the succeeding sub beam or a returning light receiving signal E+F+G+H of both the sub beams instead. Furthermore, while the invention has been described for a case that it is applied to an optical disk recording apparatus performing a differential push-pull tracking control in the above embodiment, the invention is applicable to an optical disk recording apparatus performing a 3-beam tracking control and to various optical disk recording apparatuses having an optical head emitting other sub beams. Still further, while the invention has been described for a case that it is used for recording on a CD-R disk in the above embodiment, the invention is applicable to a DVD-R disk and other write-once-read-many optical disks and further to optical disks other than the write-once-read-many optical disks.

What is claimed is:

1. A method of recording information on an optical disk in the form of a sequence of pits along a track of the optical disk, the method comprising the steps of:
   generating a main optical beam and a sub optical beam while modulating a power of the main optical beam and the sub optical beam according to a recording signal representative of the information, the main optical beam having a power sufficient to form the pit, the sub optical beam preceding the main optical beam and having a power insufficient to form the pit;
   irradiating the main optical beam along the track to form the sequence of pits;
   irradiating the sub optical beam onto a vicinity area which is not irradiated by the main optical beam but which is adjacent to an area irradiated by the main optical beam;
   detecting a first return signal level of the sub optical beam reflected back from the vicinity area at a timing when the pit is formed by the main optical beam;
   detecting a second return signal level of the sub optical beam reflected back from the vicinity area at another timing when the pit is not formed; and
   controlling the power of the main optical beam in a real time basis during the recording of information based on both of the first return signal level and the second return signal level of the preceding sub optical beam only.

2. The method according to claim 1, wherein the step of controlling comprises subtracting the second return signal level from the first return signal level to obtain a subtraction value, comparing the subtraction value with a predetermined reference value to obtain a comparison result, and controlling the power of the main optical beam based on the comparison result.

3. The method according to claim 2, further comprising the steps of provisionally irradiating the main optical beam onto a test area of the optical disk to determine an optimal power of the main optical beam, and predetermining the reference value in correspondence to the optimal power, so that the power of the main optical beam is controlled to follow the optimal power.

4. An apparatus for recording information on an optical disk in the form of a sequence of pits along a track of the optical disk, the apparatus comprising:
   an optical head that generates a main optical beam and a sub optical beam while modulating a power of the main optical beam and the sub optical beam according to a recording signal representative of the information, the main optical beam having a power sufficient to form the pit, the sub optical beam having a power insufficient to form the pit;
   the optical head irradiating the main optical beam along the track to form the sequence of pits, and irradiating the sub optical beam onto a vicinity area which is not irradiated by the main optical beam but which is adjacent to an area irradiated by the main optical beam;
   a first sample & hold circuit that samples and holds a first return signal level detected from the sub optical beam reflected back from the vicinity area at a timing when the pit is formed by the main optical beam;

a second sample & hold circuit that samples and holds a second return signal level detected from the sub optical beam reflected back from the vicinity area at another timing when the pit is not formed;

a subtracting circuit that subtracts the second return signal level sampled and held by the second sample & hold circuit from the first return signal level sampled and held by the first sample & hold circuit to obtain a subtraction value;

a comparing circuit that compares the subtraction value with a predetermined reference value to obtain a comparison result; and a controlling circuit that controls the power of the main optical beam based on the comparison result.

5. An apparatus for recording information on an optical disk in the form of a sequence of pits along a track of the optical disk, the apparatus comprising:

an optical head that generates a main optical beam and a pair of preceding and succeeding sub optical beams while modulating a power of the main optical beam and the preceding and succeeding sub optical beams according to a recording signal representative of the information, the main optical beam having a power sufficient to form the pit, the preceding and succeeding sub optical beams having a power insufficient to form the pit;

the optical head irradiating the main optical beam along the track to form the sequence of pits, irradiating the preceding sub optical beam onto a vicinity area which is not irradiated by the main optical beam and which precedes to a target area irradiated by the main optical beam, and irradiating the succeeding sub optical beam onto another vicinity area which is not irradiated by the main optical beam and which succeeds to a target area irradiated by the main optical beam;

a main optical receiving element contained in the optical head and divided into four segments for receiving the main optical beam reflected back from the target area and outputting four output signals from the four segments;

a preceding optical receiving element contained in the optical head and divided into two segments for receiving the preceding sub optical beam reflected back from the vicinity area and outputting two output signals from the two segments;

a succeeding optical receiving element contained in the optical head and divided into two segments for receiving the succeeding sub optical beam reflected back from the vicinity area and outputting two output signals from the two segments;

a tracking control circuit that performs a differential push-pull tracking control based on the output signals from the main optical receiving element and the preceding and succeeding optical receiving elements for tracking the main optical beam along the track of the optical disk;

a focusing control circuit that performs a focusing control based on the output signals from the main optical receiving element for focusing the main optical beam relative to the target area;

a summing circuit that sums the two output signals with each other fed from the two segments of either the preceding or succeeding optical receiving element to provide a summation value;

a first sample & hold circuit that samples and holds a first summation value outputted from the summing circuit at a timing when the pit is formed by the main optical beam;

a second sample & hold circuit that samples and holds a second summation value outputted from the summing circuit at another timing when the pit is not formed;

a subtracting circuit that subtracts the second summation value from the first summation value to obtain a subtraction value;

a comparing circuit that compares the subtraction value with a predetermined reference value to obtain a comparison result; and a controlling circuit that controls the power of the main optical beam based on the comparison result.

6. An apparatus for recording information on an optical disk in the form of a sequence of pits along a track of the optical disk, the apparatus comprising:

generating means for generating a main optical beam and a sub optical beam while modulating a power of the main optical beam and the sub optical beam according to a recording signal representative of the information, the main optical beam having a power sufficient to form the pit, the sub optical beam preceding the main beam and having a power insufficient to form the pit;

main irradiating means for irradiating the main optical beam along the track to form the sequence of pits;

sub irradiating means for irradiating the sub optical beam onto a vicinity area which is not irradiated by the main optical beam but which is adjacent to an area irradiated by the main optical beam;

first detecting means for detecting a first return signal level of the sub optical beam reflected back from the vicinity area at a timing when the pit is formed by the main optical beam;

second detecting means for detecting a second return signal level of the sub optical beam reflected back from the vicinity area at another timing when the pit is not formed; and controlling means for controlling the power of the main optical beam in a real time basis during the recording of information based on both of the first return signal level and the second return signal level of the preceding sub optical beam only.

7. The apparatus according to claim 6, wherein the controlling means subtracts the second return signal level from the first return signal level to obtain a subtraction value, compares the subtraction value with a predetermined reference value to obtain a comparison result, and controls the power of the main optical beam based on the comparison result.

8. The apparatus according to claim 7, further comprising test irradiating means for provisionally irradiating the main optical beam onto a test area of the optical disk to determine an optimal power of the main optical beam, and predetermining means for determining the reference value in correspondence to the optimal power, so that the power of the main optical beam is controlled to follow the optimal power.

9. An apparatus for recording information on an optical disk in the form of a sequence of pits along a track of the optical disk, the apparatus comprising:

optical head means for generating a main optical beam and a sub optical beam while modulating a power of the main optical beam and the sub optical beam according to a recording signal representative of the information, the main optical beam having a power sufficient to form the pit, the sub optical beam having a power insufficient to form the pit;

the optical head means irradiating the main optical beam along the track to form the sequence of pits, and irradiating the sub optical beam onto a vicinity area which is not irradiated by the main optical beam but which is adjacent to an area irradiated by the main optical beam;

first sample & hold means for sampling and holding a first return signal level detected from the sub optical beam reflected back from the vicinity area at a timing when the pit is formed by the main optical beam;

second sample & hold means for sampling and holding a second return signal level detected from the sub optical beam reflected back from the vicinity area at another timing when the pit is not formed;

subtracting means for subtracting the second return signal level sampled and held by the second sample & hold means from the first return signal level sampled and held by the first sample & hold means to obtain a subtraction value;

comparing means for comparing the subtraction value with a predetermined reference value to obtain a comparison result; and controlling means for controlling the power of the main optical beam based on the comparison result.

10. An apparatus for recording information on an optical disk in the form of a sequence of pits along a track of the optical disk, the apparatus comprising:

optical head means for generating a main optical beam and a pair of preceding and succeeding sub optical beams while modulating a power of the main optical beam and the preceding and succeeding sub optical beams according to a recording signal representative of the information, the main optical beam having a power sufficient to form the pit, the preceding and succeeding sub optical beams having a power insufficient to form the pit;

the optical head means irradiating the main optical beam along the track to form the sequence of pits, irradiating the preceding sub optical beam onto a vicinity area which is not irradiated by the main optical beam and which precedes to a target area irradiated by the main optical beam, and irradiating the succeeding sub optical beam onto another vicinity area which is not irradiated by the main optical beam and which succeeds to a target area irradiated by the main optical beam;

main optical receiving means contained in the optical head means and divided into four segments for receiving the main optical beam reflected back from the target area and outputting four output signals from the four segments;

preceding optical receiving means contained in the optical head means and divided into two segments for receiving the preceding sub optical beam reflected back from the vicinity area and outputting two output signals from the two segments;

succeeding optical receiving means contained in the optical head means and divided into two segments for receiving the succeeding sub optical beam reflected back from the vicinity area and outputting two output signals from the two segments;

tracking control means for performing a differential push-pull tracking control based on the output signals from the main optical receiving means and the preceding and succeeding optical receiving means for tracking the main optical beam along the track of the optical disk;

focusing control means for performing a focusing control based on the output signals from the main optical receiving means for focusing the main optical beam relative to the target area;

summing means for summing the two output signals with each other fed from the two segments of either the preceding or succeeding optical receiving means to provide a summation value;

first sample & hold means for sampling and holding a first summation value outputted from the summing means at a timing when the pit is formed by the main optical beam;

second sample & hold means for sampling and holding a second summation value outputted from the summing means at another timing when the pit is not formed;

subtracting means for subtracting the second summation value from the first summation value to obtain a subtraction value;

comparing means for comparing the subtraction value with a predetermined reference value to obtain a comparison result; and controlling means for controlling the power of the main optical beam based on the comparison result.

* * * * *